(12) United States Patent
Baumgaertel

(10) Patent No.: US 10,428,795 B2
(45) Date of Patent: Oct. 1, 2019

(54) METHOD AND CONTROL DEVICE FOR A WIND TURBINE, AND COMPUTER PROGRAM PRODUCT, DIGITAL STORAGE MEDIUM AND WIND TURBINE

(71) Applicant: Wobben Properties GmbH, Aurich (DE)

(72) Inventor: Christian Baumgaertel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 1137 days.

(21) Appl. No.: 14/425,287

(22) PCT Filed: Jun. 20, 2013

(86) PCT No.: PCT/EP2013/062867
§ 371 (c)(1),
(2) Date: Mar. 2, 2015

(87) PCT Pub. No.: WO2014/032826
PCT Pub. Date: Mar. 6, 2014

(65) Prior Publication Data
US 2015/0219073 A1    Aug. 6, 2015

(30) Foreign Application Priority Data
Sep. 3, 2012   (DE) .................... 10 2012 215 575

(51) Int. Cl.
*F03D 7/02* (2006.01)
*F03D 1/00* (2006.01)
(Continued)

(52) U.S. Cl.
CPC .......... *F03D 7/0248* (2013.01); *F03D 7/022* (2013.01); *F03D 7/024* (2013.01); *F03D 7/0264* (2013.01);
(Continued)

(58) Field of Classification Search
CPC .... F03D 7/0244; F03D 7/0248; F03D 7/0252; F03D 7/0264; F03D 7/0268; F03D 7/0272; F03D 80/50; H02K 49/00–49/12
See application file for complete search history.

(56) References Cited

U.S. PATENT DOCUMENTS 8,378,643 B2    2/2013   Arinaga et al.
9,086,048 B2    7/2015   Roesmann et al.
(Continued)

FOREIGN PATENT DOCUMENTS

CL         43968       6/1997
CN     101463798 A     6/2009
(Continued)

*Primary Examiner* — Jason D Shanske
*Assistant Examiner* — Julian B Getachew
(74) *Attorney, Agent, or Firm* — Seed Intellectual Property Law Group LLP

(57) ABSTRACT

The invention concerns a method of operating a wind power installation in which the rotor is brought to a halt and fixed, comprising the steps: braking the rotor, positioning the rotor at a stopped position, and fixing the rotor in the stopped position. According to the invention it is provided that an end position is predetermined, the rotor is braked in regulated fashion to a stopped position associated with the end position, and for positioning for the predetermined end position the rotor is braked in an automated procedure until stopped at the stopped position, and for fixing in the stopped position a mechanical fixing device is applied, in particular automatically.

18 Claims, 7 Drawing Sheets

(51) Int. Cl.
*F03D 7/04* (2006.01)
*F03D 15/20* (2016.01)
*F03D 80/50* (2016.01)

(52) U.S. Cl.
CPC ........... *F03D 7/0272* (2013.01); *F03D 7/042* (2013.01); *F03D 7/046* (2013.01); *F03D 15/20* (2016.05); *F03D 80/50* (2016.05); *F05B 2260/30* (2013.01); *F05B 2260/301* (2013.01); *F05B 2260/901* (2013.01); *F05B 2260/902* (2013.01); *F05B 2260/903* (2013.01); *F05B 2270/101* (2013.01); *F05B 2270/1095* (2013.01); *F05B 2270/303* (2013.01); *F05B 2270/309* (2013.01); *F05B 2270/32* (2013.01); *F05B 2270/326* (2013.01); *F05B 2270/327* (2013.01); *F05B 2270/328* (2013.01); *F05B 2270/404* (2013.01); *F05B 2270/802* (2013.01); *F05B 2270/809* (2013.01); *Y02E 10/721* (2013.01); *Y02E 10/723* (2013.01)

(56) References Cited

U.S. PATENT DOCUMENTS

| | | | |
|---|---|---|---|
| 9,261,078 | B2 | 2/2016 | Calley |
| 2002/0105189 | A1* | 8/2002 | Mikhail ................ F03D 7/0224 290/44 |
| 2007/0187954 | A1 | 8/2007 | Struve et al. |
| 2009/0162202 | A1 | 6/2009 | Nies et al. |
| 2010/0194114 | A1 | 8/2010 | Pechlivanoglou et al. |
| 2011/0121579 | A1 | 5/2011 | Eriksen et al. |
| 2011/0187107 | A1 | 8/2011 | Toyohara et al. |
| 2011/0238371 | A1 | 9/2011 | Altemark et al. |
| 2012/0133155 | A1 | 5/2012 | Sorg |

FOREIGN PATENT DOCUMENTS

| | | |
|---|---|---|
| CN | 101574967 A | 11/2009 |
| CN | 102080630 A | 6/2011 |
| CN | 102472249 A | 5/2012 |
| DE | 31 27 439 C2 | 1/1986 |
| DE | 100 31 473 C1 | 2/2002 |
| DE | 10031472 C1 | 4/2002 |
| DE | 10 2004 013 624 A1 | 10/2005 |
| DE | 10 2007 058 746 A1 | 12/2008 |
| DE | 10 2009 028 612 A1 | 2/2011 |
| EP | 2 072 814 A2 | 6/2009 |
| EP | 2 369 177 A2 | 9/2011 |
| ES | 2366790 T3 | 10/2011 |
| ES | 2382840 T3 | 6/2012 |
| JP | 2010156318 A | 7/2010 |
| JP | 2011112227 A | 6/2011 |
| RU | 2305204 C2 | 8/2007 |
| RU | 2430463 c2 | 9/2011 |
| WO | 2011117293 A2 | 9/2011 |
| WO | 2012/095111 A1 | 7/2012 |

* cited by examiner

METHOD AND CONTROL DEVICE FOR A WIND TURBINE, AND COMPUTER PROGRAM PRODUCT, DIGITAL STORAGE MEDIUM AND WIND TURBINE

BACKGROUND

Technical Field

The invention concerns a method of operating a wind power installation in which the rotor is brought to a halt and arrested, wherein the rotor is braked, positioned at a stopped position and fixed in the stopped position. The invention also concerns a control device for operating the wind power installation as well as a corresponding computer program product and a digital storage medium with the computer program product. The invention also concerns a wind power installation having a pod at which a wind-drivable rotor is drivingly coupled to a generator by way of a rotor hub, wherein the rotor can be brought to a halt and fixed by braking, positioning and fixing of the rotor.

Description of the Related Art

In a wind power installation of the above-indicated kind it is known to provide a braking function for the rotor, which is capable of decelerating the rotor from a nominal rotary speed to a braked rotary speed; accordingly, there is provided for example a mechanical or aerodynamic braking function for the rotor as part of the drive train or coupled to the rotor. The mechanical braking function is implemented in particular in situations in which an aerodynamic braking function is found to be inadequate. An aerodynamic braking function occurs when the rotor is intentionally braked by adjusting a pitch angle of the rotor blades; that can reduce the rotor to a lower speed highly effectively, but usually cannot bring it to a halt or move it to a dependable stopped position. An unwanted aerodynamic braking function occurs in the event of the flow at the rotor blade breaking away or in the case of such an unwanted aerodynamic effect.

When the wind power installation is in an adequately braked operating mode of the rotor, it can be brought to the stopped condition by estimating a residual rotary speed of the rotor and an approach time of the brake with a mechanical brake—for example an electromechanically or hydraulically operable brake—as well as a deceleration effect thereof. The definitive stopped position however is within the limits of a degree of estimation accuracy on the part of service personnel concerning the foregoing parameters of the residual rotary speed of the rotor and in respect of the approach time and the deceleration of a mechanical brake, and is uncertain in that respect. In order therefore to be able to bring a rotor reliably to a halt and to be able to fix it in the stopped condition the rotor must be positioned, within the limits of the estimation accuracy, in such a way that a position in which it can be fixed is precisely reached and the rotor remains in a stopped condition at that position for a sufficient period of time. On the other hand it is found to be complicated and expensive to find a position in which the rotor can be fixed, in particular arrested, as a fixing position and in particular an arresting position is basically not established in the context of the positioning procedure in the braking operation, but is the subject of experience on the part of the service personnel.

Carrying out works on the rotor should be allowed only when the rotor is in the fixed and in particular arrested condition thereof the time for fixing and in particular arresting it is thus deducted from the actual service time and should be minimized. In an emergency situation definitive arresting of the rotor can be effected as an exceptional measure in a drastic procedure for example only by dynamic bolting in, in which a rotor which is still rotating is caught by means of an arresting bolt and thus brought abruptly to a halt. The procedure involved in dynamically bolting in the rotor is however detrimental to the arresting components of the wind power installation, which is in particular fatal if damage is caused to the fixing device. In the attempt to implement dynamic bolting when the rotor is still rotating, for example an arresting bolt is slid along an arresting arm and latchingly engaged into an arresting groove in an overload situation; this will rub away the arresting arm and parts of the arresting arm can break off in the region of the arresting groove; the result of this can be that the arresting components can no longer guarantee that the wind power installation is arrested. Reliable positionability of the rotor in the braking procedure would be desirable in order to be able to fix it without error and in particular arrest it. In particular it is desirable to avoid a dynamic rotor bolting-in operation.

BRIEF SUMMARY

One or more embodiments of the present invention is to provide a method and an apparatus which make it possible, when shutting down a wind power installation, to position the rotor in an improved fashion, in particular to be able to fix it and preferably arrest it. Preferably this involves a method of shutting down the wind power installation where utilized from the operational point of view. In particular positioning should be reliably effected in such a way that fixing and in particular arresting is possible in the stopped position without damage to a stationary part of the wind power installation and automatically. One embodiment of the invention permits positioning of the rotor in accordance with a preset end position.

One embodiment of the invention is directed to a method of operating a wind power installation. According to the embodiment, it is provided that an end position is predetermined, the rotor is braked in controlled fashion to a stopped position associated with the end position, and for positioning for the predetermined end position the rotor is braked in an automated procedure until stopped at the stopped position, and for fixing, in particular arresting, in the stopped position a mechanical fixing device is applied. In particular the mechanical fixing device can be applied automatically.

Another embodiment of the invention leads on to a control device for a wind power installation, which is adapted to carry out the method of operating the wind power installation, in particular for shutting down the wind power installation as is necessary for operational reasons. The embodiments are also directed to a computer program product as well as a digital storage medium.

The embodiment directed to the apparatus is attained with a wind power installation. According to the embodiment the wind power installation has a control device which is adapted to receive an input of an end position, to control braking of the rotor to a stopped position associated with the end position and, in the positioning operation for the predetermined end position, to brake the rotor in automated fashion until it is stopped at the stopped position, and for the fixing operation, in particular the arresting operation, in the stopped position, detecting the application of a mechanical fixing device, in particular automatically applying a mechanical fixing device.

One or more embodiments are found to be sufficiently precise and dependable in setting the stopped position. In particular, in the context of a particularly advantageous development, it is possible to provide a mechanical fixing device which is automatically applied for fixing the rotor and in particular arresting it in the stopped position. That can be effected with a force for restraining a torque, which is designed to correspond to the aerodynamic forces on the rotor, for example it can be designed in accordance with an existing wind speed. In principle manual application of the mechanical fixing device is also possible. In the automatic and also the manual application procedure it is found to be desirable that the stopped position is suitable for fixing and in particular arresting the rotor. In particular this is found to be advantageous for a mechanical fixing device which uses a positively locking relationship between a stationary part of the wind power installation and a part of the rotor for arresting it in the stopped position. In principle a frictional engagement is additionally or alternatively possible. One or more embodiments thus affords the basis for applying a mechanical fixing device in a way which is as resistance-free as possible and as simple and reliable as possible, in particular for arresting the rotor in the stopped position, with the aim of preventing the rotor from restarting.

In particular a manual bolting-in or arresting process, as hitherto is to be implemented manually is now no longer necessarily dependent on the personal experience of a personnel member. Working safety is also enhanced as a member of the service personnel does not necessarily have to advance to the rotating region of the wind power installation in the pod in order to have to provide for re-positioning of the rotor after it has stopped, in particular for fixing it, in particular arresting it. Thus one or more embodiment can also provide for example separating protection arrangement which is to be opened only after the rotor has been fixed, in particular arrested, in the stopped position. A dynamic rotor bolting operation as referred to in the opening part of this specification is then made entirely impossible and any damage caused thereby is prevented. A maintenance time is also reduced in the service situation as a braking and positioning operation can firstly be automatically initiated, for example when the service personnel enter at the base of the pylon. A fixing operation, in particular an arresting operation, can possibly also be already automatically initiated. Overall that reduces the installation stoppage time.

Preferred developments of the invention are set forth in the appendant claims and set forth individual advantageous possible ways of further developing the concept of the invention in accordance with the object thereof and in regard to advantageous possible options.

Particularly preferably there are provided one or more different braking functions; that increases the effectiveness of the braking action. In particular a mechanical braking action can be implemented in controlled fashion and/or an aerodynamic braking action can be produced in controlled fashion and/or excitation of the generator, in particular the generator rotor, can be controlled. For that purpose there can be provided a braking system having a mechanical operating brake and/or an aerodynamic blade brake and/or an electromagnetic generator brake and/or a mechanical fixing device, in particular applicable by frictional engagement and/or positively locking engagement. In particular it has been found that one or more of the brakes in the context of the braking system are connected to a control device for controlling the braking action. Thus a stopped position can be comparatively effectively approached, by way of a predetermined end position, and reliably arrested.

Preferably for the fixing operation, in particular for arresting in the stopped position, there is provided a mechanical fixing device which is automatically applied. That makes manual fixing or arresting of the rotor with manually actuated brake or the like hand-actuated braking means substantially redundant and increases the aspect of safety in a service situation.

Preferably an arresting operation for securing the rotor to prevent it from re-starting can be effected by positively locking engagement, in particular additionally with frictional engagement. A positively locking engagement can be effected for example by a number of positively locking fixing devices of a mechanical kind, like for example by one, two or more arresting bolts for being introduced into arresting grooves in the rotor. In that way the rotor can be arrested, while reducing the maintenance time and with nonetheless enhanced securing reliability.

In accordance with a particularly preferred, structurally implemented development the mechanical operating brake and the mechanical fixing device can be integrated together in a disc brake. That braking system can be implemented in comparatively compact and reliable fashion. Particularly preferably a fixing arm, in particular a brake disc, can be mounted to a rotating part of the wind power installation, in particular to a rotor hub housing and/or to a rotating part of the generator like for example a generator rotor, in particular a ring rotor of a ring generator. Particularly preferably a braking means—in particular a brake pad and/or an arresting bolt—can be mounted to a stationary part of the wind power installation, in particular to a machine house casing and/or a stationary part of the generator like for example a generator stator. In particular a brake pad can be provided on the stationary part of the wind power installation for application to the fixing member, in particular the brake disc, and the fixing member, in particular the brake disc, can have a number of arresting grooves associated with a number of arresting bolts which are engageable into the arresting grooves.

In accordance with a particularly preferred development the stopped position is set with arresting utilization of a latching moment of the generator. In particular an end position of the rotor can be predetermined, by an angular position of the rotor being predetermined and by the angular position being associated with a latching position of the generator.

Advantageously a continuous angle setting scale of an end position is associated by way of a discrete latching scale of the generator with a quasi-discrete angle scale of a stopped position, in particular there is predetermined a discrete latching scale over an angle division on the generator, which is predetermined by an arresting groove distribution and/or pole distribution over a generator ring, in particular a stator ring and/or a rotor ring.

A braking method which has proven to be particularly effective and advantageously regulatable is one in which excitation of the generator, in particular the generator rotor, is controlled. Advantageously in the braking operation the pole shoes of the generator rotor are excited with an excitation which is predetermined by excitation regulation in dependence on an excitation brake control value, in particular the excitation brake control value includes one or more values selected from the group of values including: rotary speed, deceleration, external temperature and wind speed.

The basic starting point for the development is that a braking effect for the rotor can be achieved by excitation of the generator, in particular a generator rotor like for example a pole shoe of the generator. This development further realized that excitation of the generator, which is suitable for producing a braking action, can advantageously be used in the context of a controlling procedure in order to set a stopped position in a controlled fashion, which position can be associated with a preset end position in predetermined fashion. Accordingly the concept allows automatic positioning of the rotor relative to the stationary part of the pod of the wind power installation. Advantageously the concept allows controlled braking of the rotor to the stopped condition in the stopped position by regulation of the generator excitation.

The development advantageously realized that, by utilizing the arresting action of excitation for deceleration purposes, the rotor deceleration can be controlled markedly more accurately as excitation for braking purposes or for presenting other deceleration of the rotor can be manually set. For example it would be possible to select excitation at a given value like 30% or the like. In contrast an electromechanical brake can at present have only two operating conditions, namely usually only closed or opened, as occurs moreover with a partly uncertain action. In contrast the excitation can be set in load-dependent and comparatively accurate fashion in the context of a control circuit so that pin-point positioning of the rotor is made basically possible, in accordance with a preset end position.

Preferably at least one rotary speed and a deceleration of the rotor are measured in the braking operation and used to control the excitation effect. For that purpose for example an incremental encoder can supply a measurement value relating to the rotary speed and/or deceleration of the rotor as the actual value. A reference rotary speed and a reference deceleration can then be set in a controller, in particular a proportional-integral-derivative (PID) controller or the like, with arresting utilization of the excitation as the control value.

In accordance with a particularly preferred development a latching moment of the generator can be used to set a stopped position which is associated with a preset end position. By way of example an end position of the rotor can advantageously be preset, by presetting an angular position of the rotor. That can be for example a 12 o'clock position or another angular position between 0 and 360°, for example 10°, 20°, 30°, 40°, 50°, 60°, 70°, 80°, 90° or a multiple thereof. When the angular position of the rotor is predetermined a latching position of the generator can be associated with the angular position. In other words, it has proven to be advantageous for a continuous angle setting scale to be associated with an end position of a discrete latching scale of the generator. The association can be a first association immediately after presetting of the rotor end position and then in the braking operation can dynamically adapt to the acute operationally-governed situation when decelerating the wind power installation. Advantageously the association between a continuous angle setting scale and the discrete latching scale of the generator is not static but can be dynamically adapted in the context of the control circuit. For example a preset end position can be firstly associated with a slightly raised stopped position and at a later moment in time with a slightly lowered stoppage position in order to remain as closely as possible to the preset end position.

A discrete latching scale is predetermined for example by way of an angle distribution on the rotor. An angle distribution is given in particular by an arresting groove and/or pole distribution over a generator ring, in particular over a stator and/or rotor ring in the case of a ring generator.

For example rotary speed deceleration, outside temperature or wind speed can serve as an excitation brake control value. For example a rotary speed position, outside temperature or wind speed can serve as a brake application control value. In other words, excitation of the generator, in particular the generator rotor, can be adjusted in dependence on a currently measured rotary speed and/or deceleration of the rotor. An outside temperature and a wind speed can additionally also be used. In particular the wind speed can also be used for controlling an aerodynamic braking action of a rotor blade of the rotor. A mechanical brake can also be predetermined in controlled fashion in accordance with a brake application control value. A rotary speed and/or position of the rotor can also be used for that purpose. An outside temperature and a wind speed can also serve as a brake application control value. In particular the development can provide that a mechanical brake is first applied below a threshold value in respect of the brake application value. In this development the method preferably provides in a first early braking operation only for a braking effect by excitation of the generator and in a second later braking operation a braking effect by means of excitation of the generator and a mechanical brake. That advantageously reduces the load on the mechanical brake. In particular a mechanical brake could be sized with a lower level of complication and expenditure and nonetheless more effectively. A mechanical brake could possibly be sized for a smaller load range.

In particular in addition to controlled excitation and a mechanical operating brake for braking the rotor, it is also possible to use a controlled aerodynamic braking action on a rotor blade of the rotor, by the rotor blade being pitched out of the wind in controlled fashion. A combination of an aerodynamic braking action and an exciter braking action as well as a mechanical brake for braking the rotor has proven to be particularly suitable for a control circuit. Preferably the method can be implemented in the development in order to decelerate the wind power installation until the rotor is stopped.

Particularly preferably the control device can be calibrated and/or can be in the form of an open system for learning optimization. In particular this concerns a control unit for application brake regulation which can be calibrated and/or which can be in the form of an open system for learning optimization of brake application. In particular this additionally or alternatively concerns a control unit for excitation braking, which can either be calibrated and/or can be in the form of an open system for learning optimization. Thus, both on the basis of calibration braking and also with a plurality of operating brakes, a control device of the wind power installation is optimized, and with an increasing utilization reduces the maintenance times of the system and the reliability of positioning of the rotor in a stopped position for arresting purposes.

It has proven to be particularly advantageous if a distribution of fixing positions, in particular arresting position distribution, is matched to a distribution of arresting grooves and/or pole distribution of the generator in such a way that an arresting position of the arresting position distribution is identical to a latching position of the generator rotor, caused by a latching moment. Basically, each excitation generates a so-called latching moment which causes the rotor to come to a halt in defined positions governed by the mechanical structure of the rotor. That concerns in particular a number of arresting grooves and a number of pairs of poles. Further mechanical structures of the rotor can also contribute to producing a latching moment. The combination of arresting grooves and poles of the generator and the arresting groove can be structurally advantageously selected in such a way that the pole sensitivity, that is to say the positioning, governed by the latching moment, of the rotor of the generator promotes the rotor bolting operation and/or arresting operation.

Preferably the wind power installation has
a mechanical operating brake and/or
an aerodynamic blade brake and/or
an electromagnetic generator brake and/or
a mechanical fixing device, in particular applicable by frictional engagement and/or positively locking engagement, wherein one or more of the brakes are connected to a control device for controlling the braking action.

It has proven advantageous if the mechanical operating brake has a first application drive with which a braking means, in particular a brake pad, can be applied to a running means, in particular a fixing arm and/or a brake disc. The mechanical operating brake advantageously has a first interface with a control device for controlling the braking action, in particular application thereof.

It has proven to be advantageous if the mechanical fixing device has a second application drive with which a braking means, in particular an arresting bolt and/or a brake pad, can be fixed to an arresting means, in particular an arresting groove and/or a brake disc. The mechanical fixing device advantageously has a second interface with a control device for controlling the arresting action.

It has proven to be advantageous if the aerodynamic blade brake has a pitch motor with which a pitch angle of the blade can be adjusted and which has a third interface with a control device for controlling the braking action, in particular the pitch control.

It has proven to be advantageous if the electromagnetic generator bake has a fourth interface for controlling the excitation of a pole shoe of the generator rotor and/or a fifth interface for communicating the latching sensitivity of the rotor.

In the method it can be provided that the first, second, third, fourth and/or fifth interface is actuable in a controlling loop.

Preferably in the wind power installation the mechanical operating brake and the mechanical fixing device are integrated in a disc brake. Preferably a fixing arm, preferably with a number of arresting grooves, in particular a brake disc, of the disc brake is mounted to a rotating part of the wind power installation and a braking means is mounted to a stationary part of the wind power installation. The brake disc can be mounted for example to a rotor hub housing. The stationary part of the wind power installation is then preferably mounted to a machine house casing.

Particularly preferably a fixing arm, in particular a brake disc, can be mounted to a rotating part of the generator like for example a generator rotor, in particular a ring rotor of a ring generator. The stationary part of the wind power installation is then preferably mounted to a stator fixing arrangement, in particular a stator carrier arrangement.

The braking means is preferably a braking unit, preferably with a brake pad and/or an arresting bolt or the like fixing means, in particular further with a suitable drive for the fixing means.

Additionally or alternatively a mechanical brake can also be in the form of a disc brake in the mechanical drive train of the machine house, in particular between a rotor hub and the generator in the drive train.

Particularly preferably a brake pad is mounted to the stationary part of the wind power installation for application to the brake disc and the brake disc has a number of arresting grooves associated with a number of arresting bolts engageable into the arresting grooves.

A sensor system, in particular with an incremental encoder and/or a wind measuring device, is adapted to measure brake control values selected from the group of values including: rotary speed, position, outside temperature, wind speed; and the sensor system is connected to a control device for controlling the braking action.

BRIEF DESCRIPTION OF THE SEVERAL VIEWS OF THE DRAWINGS

Embodiments of the invention will now be described with reference to the drawing. They are intended not only to necessarily represent the embodiments true to scale, but rather the drawing which serves for description is in diagrammatic and/or slightly distorted form. In regard to additional aspects of the teachings which can be found directly from the drawing, attention is directed to the relevant state of the art. In that respect it is to be borne in mind that many different modifications and alterations concerning the form and the detail of an embodiment can be implemented without departing from the general idea of the invention. The features of the invention disclosed in the description, the drawing and the claims can be essential for further development of the invention both individually and also in any combination. In addition the scope of the invention embraces all combinations of at least two of the features disclosed in the description, the drawing and/or the claims. The general idea of the invention is not limited to the exact form or the detail of the preferred embodiment described and illustrated hereinafter or to a subject-matter which would be restricted in comparison with the subject-matter claimed in the claims. In the case of specified measurement ranges values within the specified limits are also intended to be disclosed as non-equilibrium values and are intended to be used and claimed as desired. Further advantages, features and details of the invention will be apparent from the description hereinafter of the preferred embodiments and with reference to the drawing in which:

DETAILED DESCRIPTION

Figure 1:
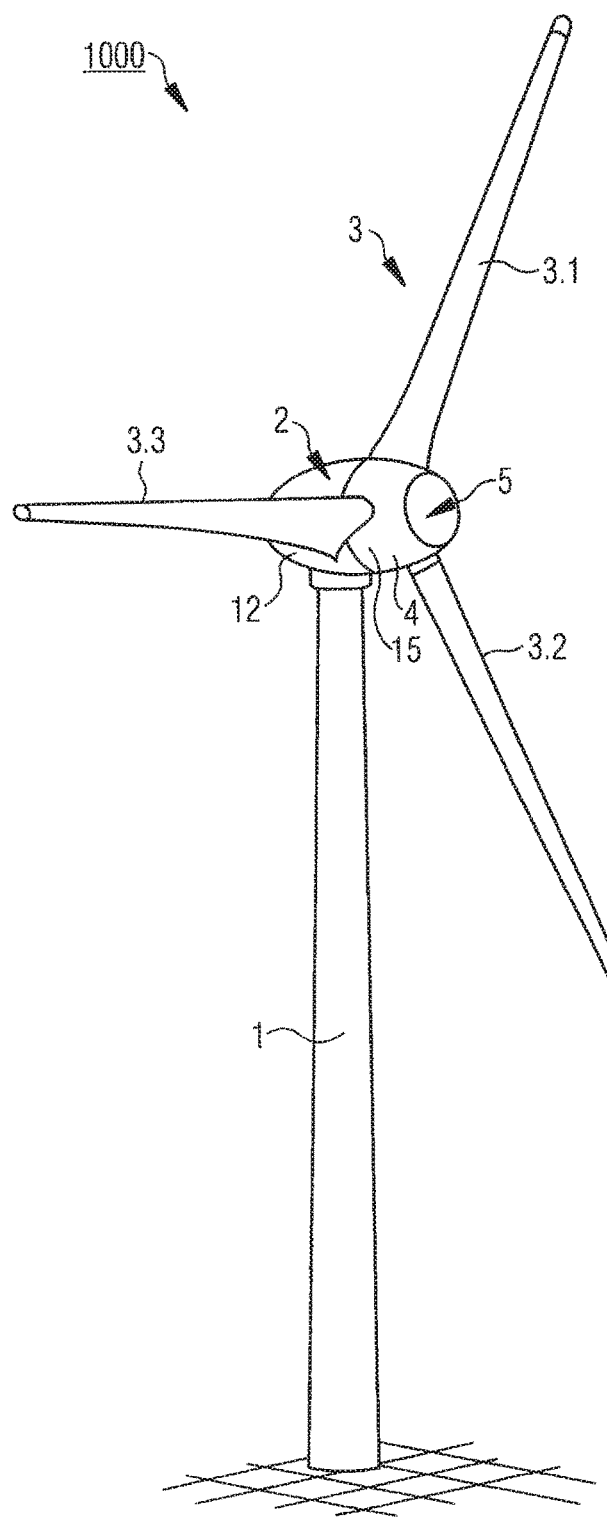
FIG. 1 shows a preferred embodiment of a wind power installation with a pod on which a wind-drivable rotor is coupled by way of a rotor hub at a rotor head to a generator drive, wherein the rotor can be brought to a halt and fixed, by controlled braking, predetermined positioning and automatic arresting of the rotor.
Figure 2:
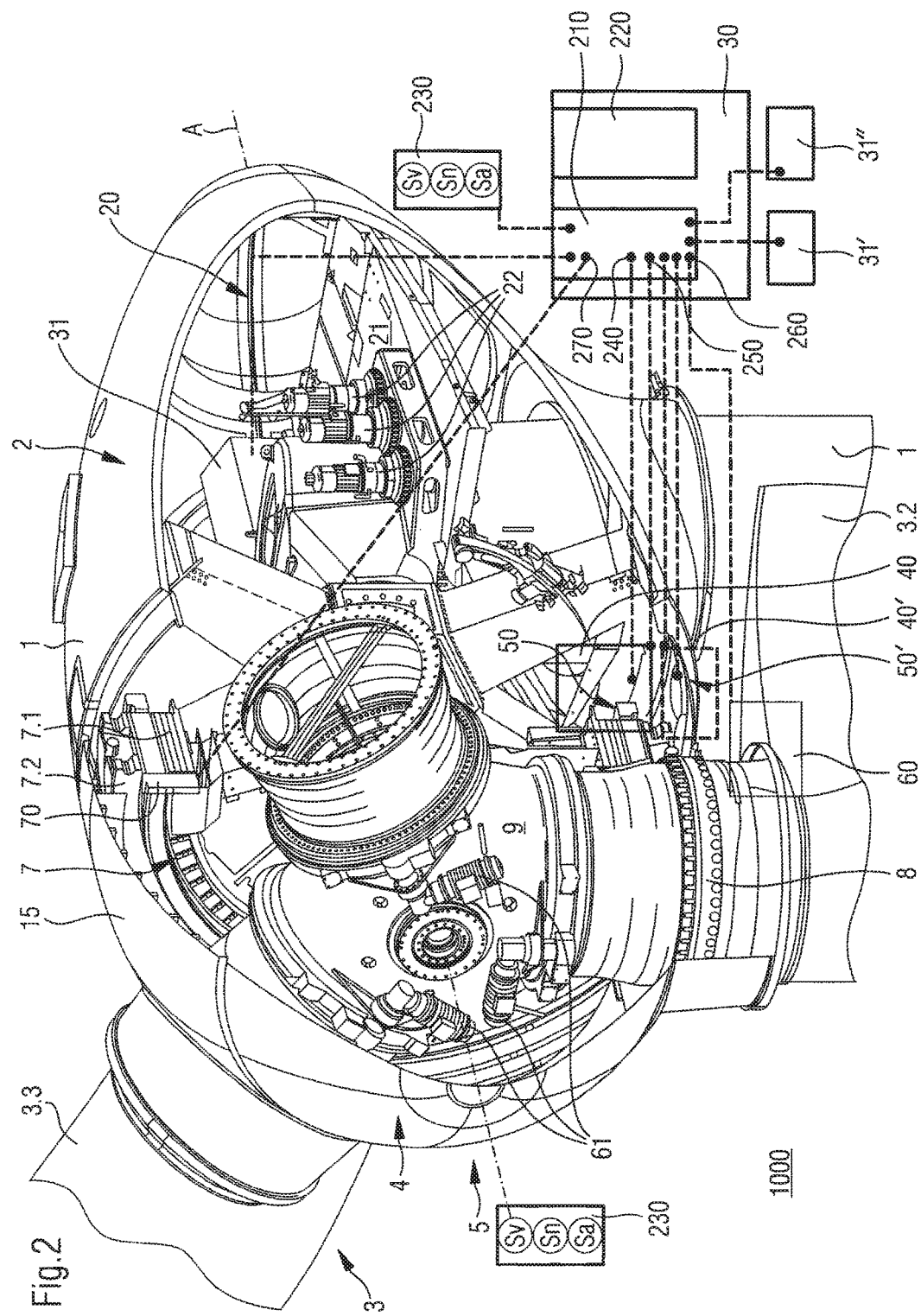
FIG. 2 shows a perspective view of a portion of a pod of the wind power installation of FIG. 1 with a diagrammatically illustrated control device for braking, positioning and arresting the rotor in the stopped position, in the present case using one or more different braking functions, namely a mechanical brake and/or an aerodynamic brake and/or an electromagnetic brake for decelerating and/or an arresting means for arresting in the stopped condition—the stopped position uses a latching position of the generator.

FIG. 1 shows a wind power installation 1000 comprising a pylon 1, a pod 2 and a rotor 3 having a plurality of and in the present case three rotor blades 3.1, 3.2, 3.3. The rotor blades 3.1, 3.2, 3.3 are drivingly coupled to the rotor head 5 by way of a spinner 4 with a rotor hub 9 disposed therein and shown in greater detail in FIG. 2 to a generator 7 shown in FIG. 2. For that purpose a rotor blade 3.1, 3.2, 3.3 is connected by way of a blade bearing 8 shown in FIG. 2 to a rotor hub 9 or a hub adaptor which drives a generator rotor 7.1 of the generator 7 for producing electric current in a stationary generator stator 7.2 of the generator 7. FIG. 2 shows the details of the machine house in the pod 2 with the specified blade bearing 8, the rotor hub 9 and the generator 7 with generator rotor 7.1 and generator stator 7.2.

When the rotor 3 is rotating a rotor hub housing 5 rotates relative to a machine house casing 14 which encloses the machine house of the pod 2. In the present case the rotor hub 9 and the blade bearing 8 engage into the rotor hub housing 5. The generator rotor 7.1 is carried in rotatably mounted relationship on a shaft journal 19, like the rotor hub 9, in such a way that a rotary movement of the rotor 3 drives the generator rotor in rotation.

A platform 21 of the machine house 20 carries a number of azimuth motors 22 for actuation of an azimuth bearing in order to orient the pod 2 with its axis A in accordance with a wind direction. On the platform 21 the wind power installation is locally controllable by way of a terminal 31 and a control device 30 of the wind power installation, shown diagrammatically in FIG. 2, can be accessed by means of the terminal 31—thus, instructions and parameters can be implemented by way of the terminal 31, by means of which the wind power installation 1000 can be decelerated for operational reasons, for example for a service situation due to operational circumstances. A first further terminal 31' in the pylon base or at the pylon base can be connected for example to the control device 30 and a second further terminal 31" can be provided in a control center and in addition can be connected to the control device 30.

Figure 6:
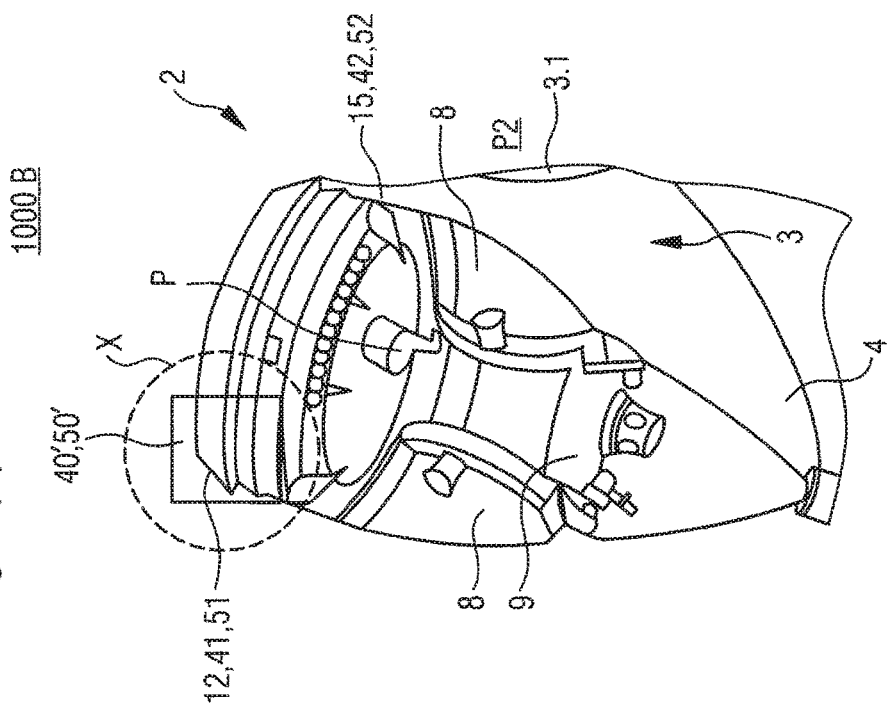
Figure 6:
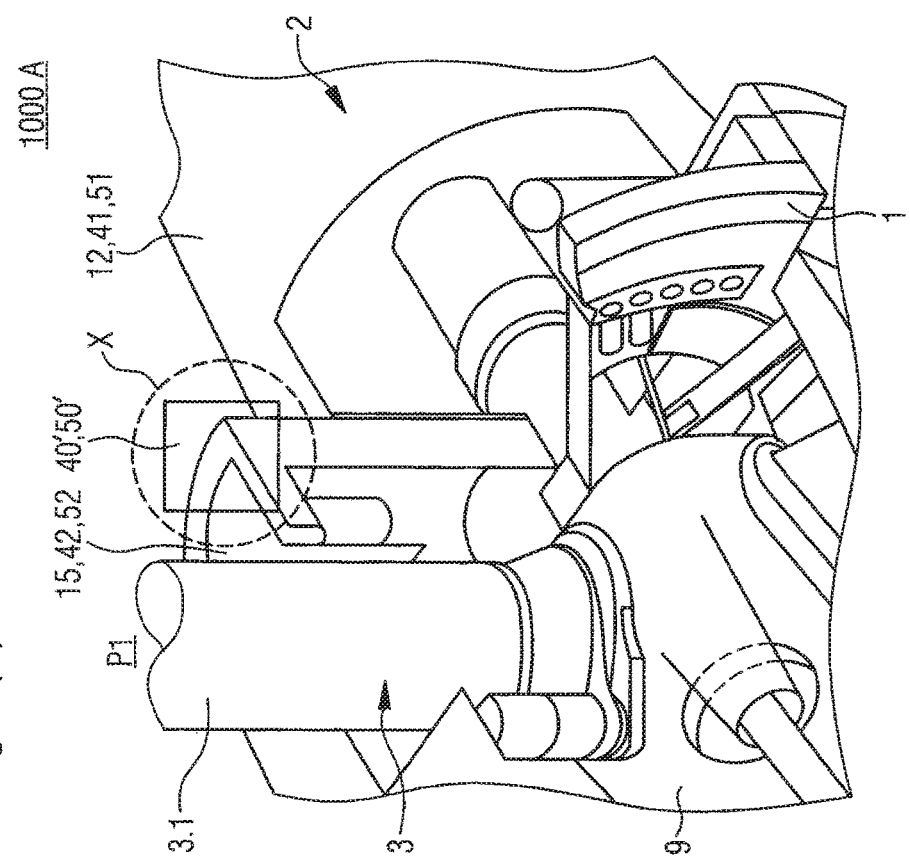

If it should be desired to perform measures in the rotor hub housing 15 in a service situation—and this possibly applies also to other measures on the wind power installation—it is necessary for the rotor 3 to be brought to a halt and arrested in the stopped condition, with the aim of substantially preventing a movement of the rotor but also preventing the wind power installation from re-starting. By way of example FIG. 6 (A) shows a stationary wind power installation 1000A in a first stopped position P1 of the rotor 3 with the rotor blade 3.1 at 12 o'clock while FIG. 6(B) shows a stopped wind power installation 1000B during a service operation of a service personnel P at a second stopped position P2 of the rotor 3 with the rotor blade 3.1 at 2 o'clock.

To prepare for the service operation, a wind power installation 1000, 1000A, 1000B is decelerated until the rotor 3 is stationary, due to the operating circumstances involved, by the rotor 3 being mechanically and/or aerodynamically braked. Without the controlled approach of the concept described herein, the rotor 3 would have to be brought to a halt at a rest position which is afforded more or less by estimation, by the braking operation. If that rest position should not coincide with the stopped position in which the rotor can be arrested, the rotor 3 would have to be moved from the inappropriate rest position into an arrestable stopped position. One or more embodiments aim to avoid the rotor 3 coming to a halt in the above-mentioned inappropriate rest position, for then additional effort is required to move the rotor from the inappropriate rest position to the arrestable stopped position.

There is also the disadvantageous possibility of abruptly stopping the rotor 3, while it is still rotating, with a not inconsiderable residual torque, by the rotor being manually caught directly at the arrestable stopped position; that is also referred to as dynamic catching. Dynamic catching is therefore effected by the rotor 3, while still rotating, first being brought to a halt by an arresting action in the stopped position. That procedure transmits considerable loads and moments to a fixing device by means of which the rotor 3 is arrested, and can seriously damage the fixing device; that is therefore to be avoided and is preferably already to be excluded as much as possible, because of the technical aspects involved.

To decelerate the wind power installation to the stopped condition of the rotor, an aerodynamic braking action of the rotor 3 can be used, with a suitable pitch angle, which can be set by pitch motors 61, of the rotor blades 3.1, 3.2, 3.3, which can be implemented by a diagrammatically symbolically illustrated aerodynamic brake 60.

In addition to such an aerodynamic brake 60, it is also possible to use a mechanical operating brake in operation of the rotor—that is to say when the rotor 3 is rotating. A mechanical operating brake can preferably engage a rotating part which is driven by the rotor 3, like for example (this is not the case here and is not shown) directly a rotating shaft. In the case of a drive train of a wind power installation with a stationary axle journal 19 (shown here), the operating brake 40 can basically engage the generator rotor this is preferably shown here and is described hereinafter with reference to FIGS. 3 and 4; in a modification (this is not the case here and is not shown) it can possibly also engage other rotating parts of the drive train like for example a rotor hub 9. In the present case a first braking means of the operating brake 40 is mounted to a generator stator 7.2 and acts on a second braking means on the generator rotor 7.1; the operating brake 40 is therefore operative between a generator stator 7.2 and a generator rotor 7.1 and in that respect is disposed between the generator stator 7.2 and the generator rotor 7.1.

In a modification an operating brake could engage a bearing on the axle journal 19, in particular on a bearing between the generator rotor 7.1 and the axle journal 19 (this is not the case here and is not shown).

A further mechanical operating brake 40 shown by way of example here can be provided additionally or alternatively between a rotating part of the pod 2 and a stationary part of the pod 2, for example between the rotor hub housing 15 and the machine house casing 12.

Additionally or alternatively to at least one of the mechanical operating brakes 40, 40' which are diagrammatically shown by way of example in FIG. 2, the wind power installation 1000 in the pod 2 has a mechanical arresting means or arresting brake also referred to as the parking brake which—arresting means is adapted by means of a mechanical fixing device to arrest the rotor 3 in the stopped condition. That fixing device 50 is diagrammatically shown by way of example in FIGS. 3 and 4—in the form of an arresting brake in combination with a mechanical operating brake 40, 40'; more specifically here with a mechanical operating brake 40 between the generator stator 7.2 and the generator rotor 7.1 (in a modification and/or with a mechanical operating brake 40' between the machine house casing 12 and the rotor hub housing 15).

Hereinafter the arresting device 50 is described in greater detail with reference to FIGS. 3 and 4, in particular with a mechanical operating brake 40 between the generator stator 7.2 and the generator rotor 7.1. The arresting means, with or without mechanical operating brake 40, can basically be implemented in a different way, for example by frictional engagement and/or positively locking engagement; an example of positively locking engagement to illustrate an arresting action is shown in FIG. 5.

In general further to illustrate a frictional engagement, brake pads or shoes—mounted to a rotating part of the wind power installation 1000—can engage a brake disc mounted on a stationary part of the wind power installation 1000 to stop or arrest the rotating part of the wind power installation. Similarly brake pads or shoes of a stationary part of the wind power installation which engage a brake disc on a rotating part of a wind power installation can be used for a mechanical operating brake. In particular in the present case it is possible to implement a mechanical operating brake 40 in combination with an arresting means. In the present case the mechanical operating brake 40 is used in an enlarged functionality with further increased operating brake pressure, as the first part of an arresting action.

The arresting means which is possibly also implemented alone, that is to say also without the above-mentioned mechanical operating brake 40, is described hereinafter by means of the fixing device 50 of FIGS. 3 and 4—an alternative arrangement of an operating brake 40' for a modified fixing device 50' is diagrammatically shown as a detail in FIGS. 6(A) and 6(B).

Hereinafter the same reference is used for identical or similar features or features of an identical or similar function, for the sake of simplicity; in particular the fixing device 50 is described in relation to FIGS. 3 and 4, in which respect attention is directed to the preceding description in relation to the other features.

Figure 3:
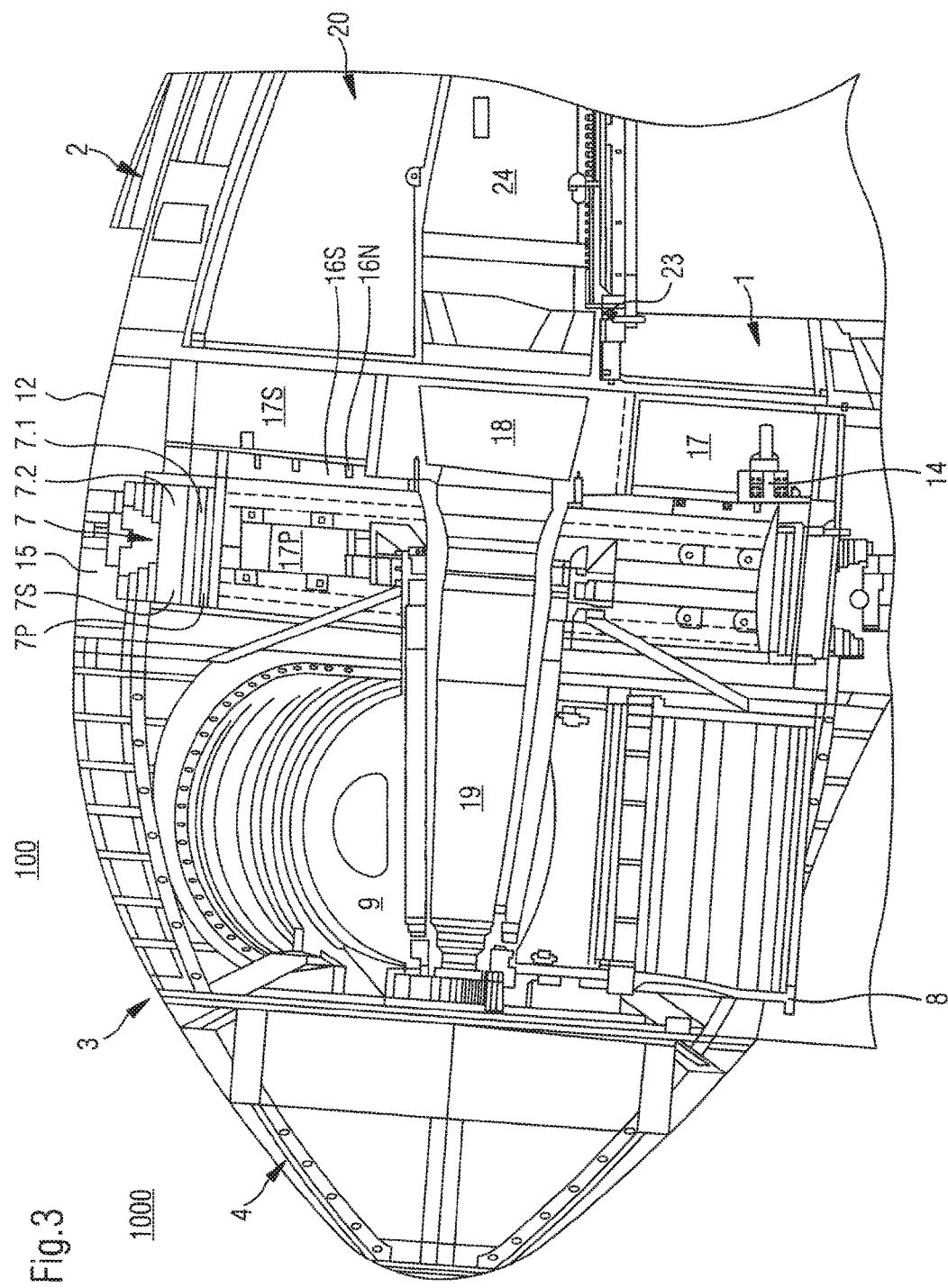
FIG. 3 shows a part sectional view of the pod of FIG. 2 illustrating a particularly preferred mechanical fixing device.

FIG. 3 shows in greater detail the structure of a system 100 comprising rotor 3 and generator 7 for forming a drive train. The rotor 3 is mounted rotatably on an axle journal 19 by way of the rotor hub 9 and likewise for the generator 7, by way of the generator rotor 7.1, wherein the rotary movement of the rotor 3 can be converted into a rotary movement of the generator rotor 7.1. In that case the generator rotor 7.1 which rotates in the generator stator 7.2 generates electric current in accordance with the design configuration of the generator 7. The generator rotor has appropriately peripherally arranged poles 7P and the generator stator 7.2 has a suitable stator winding 7S.

The generator stator 7.2 is held by a number of stator carrier arms 17 fixed to a stator star 18. The axle journal 19 and the stator star are carried by a machine carrier 24 on an azimuth bearing in the machine house 20.

To illustrate the fixing device 50 the generator rotor 7.1 has at the edge of a carrier structure 17P a fixing arm 16 with a number of fixing grooves 16N and a friction surface 16S. It should be noted that such a fixing arm which is not identified in greater detail here can also be formed at an edge of the rotor hub housing. In the present case the fixing arm 16 co-operates with a fixing means 14 to represent the above-mentioned fixing device 50 (or in a modification to represent a fixing device 50' between the machine house casing 12 and the rotor hub housing 15). The fixing device 50 (or fixing device 50') is described generally with reference to FIG. 5.

Figure 4:
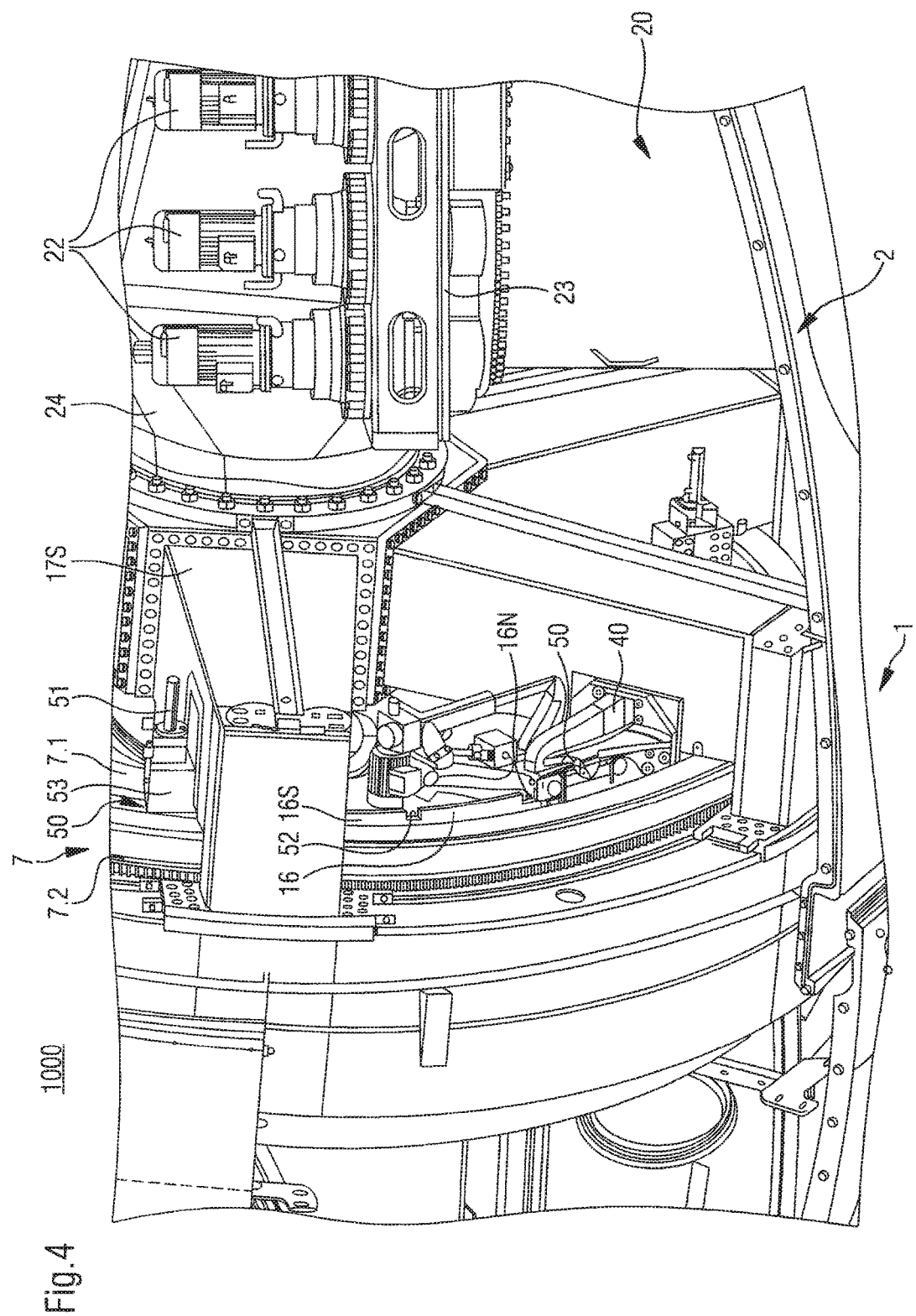
FIG. 4 shows a different part perspective view of the particularly preferred mechanical fixing device for the pod of FIG. 2.
Figure 5:
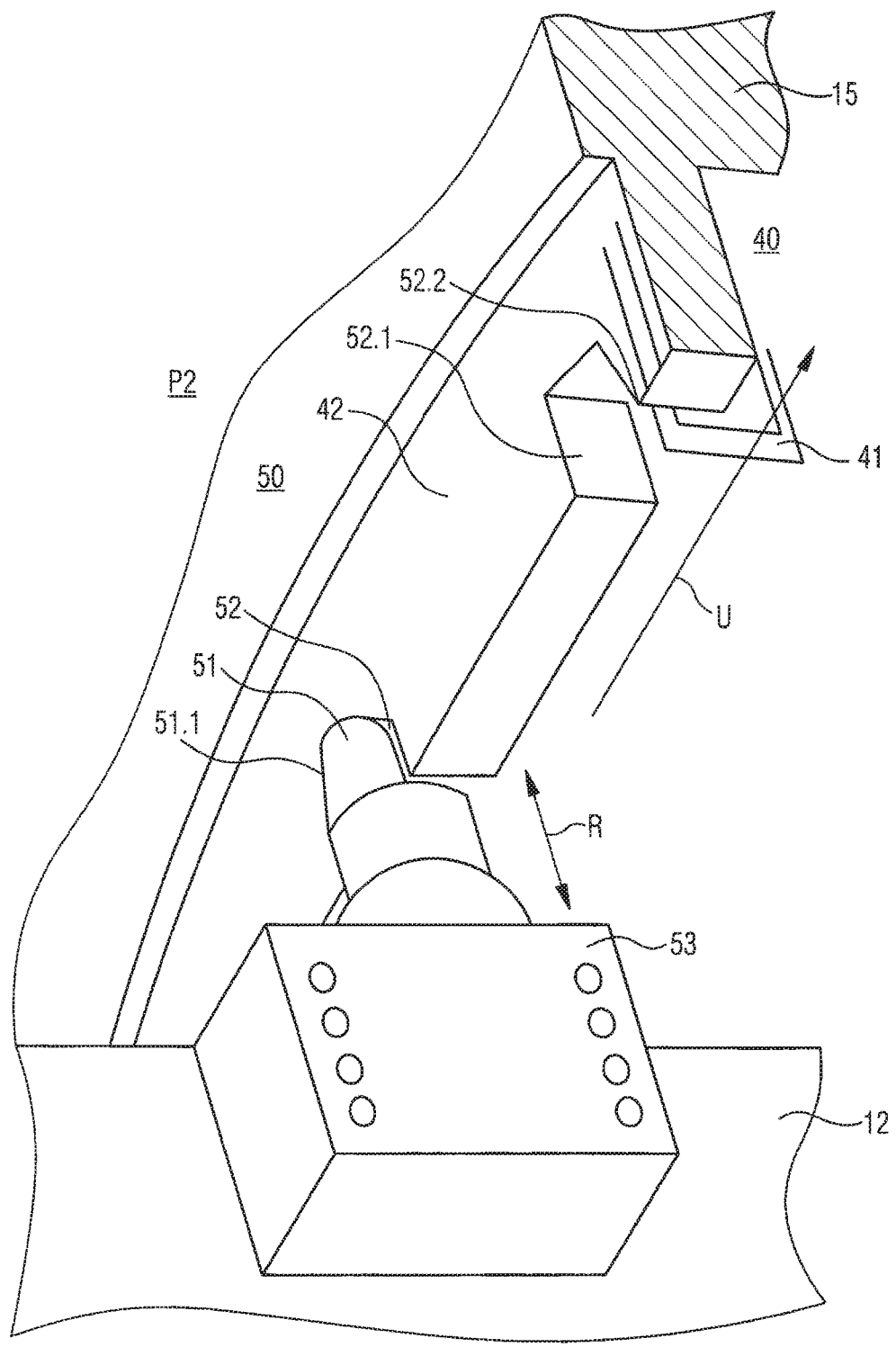
FIG. 5 is a view by way of example of the preferred mechanical fixing device on the generator with a mechanical brake in the form of a disc brake, in which a mechanical operating brake and an arresting device for arresting the rotor in the stopped position with the aim of preventing the rotor from re-starting are integrated in the disc brake and wherein the mechanical fixing device provides a positively locking engagement by means of arresting bolts and arresting grooves and/or a frictional engagement, FIG. 6 in view (A) in the region of the detail X shows the possibility of mounting a mechanical brake and/or arresting device as a mechanical fixing device in accordance with a variant between a machine house casing and a rotor hub housing and in view (B) shows the detail X from another perspective view.

FIG. 4 shows on an enlarged scale the mechanical operating brake 40 to represent the fixing device 50 with the fixing arm 16 and the fixing grooves 16N and the friction surface 16S as a perspective view on an enlarged scale between the generator rotor 7.1 and the generator stator 7.2. In particular FIG. 4, with reference to FIG. 5, as part of an operating brake with an arresting function, already shows a carrier for an arresting bolt 51 provided for engagement into an arresting groove 52 generally identified by reference 52 (here being the fixing groove 16N).

In general, to represent a positively locking connection, for example an arresting bolt 51 can engage into an arresting groove 52 in a rotating part of the wind power installation 1000 to stop the rotating part of the wind power installation. A second part of an arresting means can be formed in that way.

In a present embodiment shown in FIG. 5 a mechanical operating brake 40 as part of a mechanical fixing device 50 with arresting means is integrated in a disc brake. A fixing arm 16 in the form of a brake disc 42 is formed on a rotating part of the wind power installation in the present case on the generator rotor 7.1. A braking means—here a brake pad 41 and an arresting bolt 51—are mounted to a stationary part of the wind power installation—here the generator stator 7.2. In a modification a fixing arm can also be formed on the rotor hub housing 15 and a braking means on the machine housing 12.

The brake pad 41 is adapted for application to the brake disc 42 and is firstly part of a mechanical operating brake 40. When the rotor 3 is stopped and with an increased brake pad contact pressure, the brake pad 41 in combination with the brake disc 42 serves as the first part of a mechanical fixing device 50 by means of which the rotor 3 can be fixed. Additionally the brake disc 42 has a number of above-mentioned grooves 16N as arresting grooves 52, which are associated with a number of arresting bolts 51 engageable into the arresting grooves 52. The combination of arresting bolts 51 and arresting grooves 52 as the second part of the mechanical fixing device 50 forms a genuine arresting means which—once set—stops the rotor 3 securely and independently of external circumstances (like wind speed and network availability) and avoids the risk of movement, and indeed re-starting.

In that respect there is basically the problem described generally hereinbefore, that in particular, in the case of a parking brake implemented by positively locking engagement, or the like arresting device—as with the described second part of the mechanical fixing device 50—there are only given stopped positions, for example P1, P2 in FIG. 6 of the rotor 3 for an arresting position, as it is only in an arresting position that an arresting bolt 51 engages into an arresting groove 52. Usually a residual rotary speed of the rotor 3 is estimated for that purpose by service personnel P shown in FIG. 6(B). Having regard to the required application time of an operating brake 40, 40'—for example by virtue of an electromechanical or hydraulic application device—and also having regard to a delay with the mechanical operating brake 40, 40', the attempt is made to position the rotor 3 in such a way that an arresting groove 52 in the brake disc 42 comes to a halt precisely in front of the arresting bolt 51. It is only in such a situation that the arresting means—here therefore the second part of the fixing device 40—could be arrested, in particular with an arresting bolt 50 being boltingly engaged into an arresting groove 52.

To overcome the described problems on the example of the wind power installation 1000 FIG. 2 shows a control device 30 which is operable by way of one or more operating terminals 31, 31', 31" and which is controllingly connected to functionally different brakes. Those brakes include:

at least one of the operating brakes 40, 40', of which each can be provided alone or both in combination, the aerodynamic brake 60 which is operable by way of a number of pitch motors 61 acting on a pitch angle of the rotor blades 3.1, 3.2, 3.3, an electromagnetic brake 70 which is formed on the generator 7 and which can be controlled with excitation of the generator 7, in particular the generator rotor 7.1, and an arresting means as part of the mechanical fixing device 50 which in the present case is implemented by a number of arresting bolts 51 and arresting grooves 52 between a rotor hub housing 15 and the machine house casing 12 of the pod 2.

The brakes 40, 40', 50 as well as 60 and 70 are controllingly connected to the control device 30. In the present case a braking system 200 is connected to the system 100, referred to as the rotor-generator assembly, comprising pod 2, generator 7 and rotor 3, namely to one or more of the brakes 40, 40', 50, 60 and/or 70 which is controllingly connected to a braking module 210 in the control device 30, by way of interfaces 240, 250, 260, 270, for actuation of the brake or brakes; that is to say for controlling of the electrically and/or hydraulically applicable mechanical operating brake 40, for automatically implementing the arresting action by means of the mechanical fixing device 50, for actuation of the aerodynamic brake 60 and for actuation of the electromagnetic brake 70. The braking module 210 can be operated by way of suitable control lines shown in broken line, which can be operated by way of terminals 31, 31', 31". A keyboard and/or a monitor are connected as an input terminal to the control device 30, which makes it possible to input a desired end position of the rotor 3.

The braking module 210 receives measurement values in relation to controlling parameters from a sensor system 230 which has at least a wind speed sensor Sv, a rotary speed sensor Sn and a deceleration sensor Sa. The braking module 210 can be calibrated by way of a calibration module 220.

In principle the braking system 200 makes it possible for the system 100 comprising rotor 3 and generator 7 at/in the pod 2 of the wind power installation 1000, that is to say the rotor 3 and the generator 7, to be braked in automated fashion in operation and braked down to a stopped condition at the end position in positionally accurate relationship, by means of one or more of the controlled brakes 40, 40' and 60 and 70 and by way of the arresting means as part of the mechanical fixing device 50 (in a modification additionally or alternatively the fixing device 50') to arrest it in the stopped condition practically at the desired end position.

FIG. 6 shows in each of views A and B a wind power installation 1000A, 1000B of older and more recent structure respectively in the region of the pod 2. In the present case the same references are used for identical or similar parts or parts involving an identical or similar function. The detail X in view (A) and (B) is shown in FIG. 5 for detailed illustration of a mechanical operating brake 40', in combination with a mechanical arresting device as the mechanical fixing device 50'.

The stationary part of the wind power installation 1000A, 1000B can be formed by a machine house casing 12. The part of the wind power installation that is movable as part of the rotor 3, that is to say that rotates, can be the rotor hub housing 15 of the rotor 3.

In the preferred embodiment in FIGS. 2, 3 and 4 the stationary part of the wind power installation 1000 is formed in the present case by a generator stator 7.2, namely more specifically a carrier arm of the generator stator 7.2. The movable, that is to say rotating, part of the wind power installation, driven by the rotor 3, is in the present case the generator rotor 7.1 of the generator 7.

The arresting bolt 51 with the arresting groove 52 forms the arresting device in the form of the second part of the mechanical fixing device 50. The arresting bolt 51 can be applied to the arresting groove 52 in the radial direction R by way of a motor means 53—for example an electric motor or a hydraulic means or a pneumatic means or a magnetic actuator—and with suitable relative positioning along the periphery U—that is to say with coincident angular positions of an arresting groove 52 and an arresting bolt 51—the arresting bolt 51 can be moved into the arresting groove 52, by actuation of the motor means 53. The motor means 53 can possibly also be such that it already moves along the radius R when the arresting bolt 51 is only partially disposed at the angular position of the arresting groove 52. The arresting groove 52 has opening flanks 52.1, 52.2 which can receive the arresting bolt 51 in a funnel configuration, so that it can self-adjustingly move into the arresting groove 52. Correspondingly the arresting bolt 51 has an outside surface 51.1 which tapers substantially in a conical shape and which is of an inclination which is substantially the same in magnitude or which is somewhat steeper, than the flanks 52.1, 52.2 of the arresting groove 52.

The mechanical operating brake 40 is in the form of a disc brake; it therefore has a functionality provided by the co-operation of brake pads 41 and brake disc 42. The only symbolically illustrated brake pads 41 can also exert friction on the brake disc 42 in operation of a wind power installation 1000, that is to say with the rotor 3 rotating or with the rotor housing 15 rotating, in frictional engagement.

Particularly in combination with the aerodynamic brake 60 this supports a highly effective possible way of bringing the rotor 3 rapidly to a halt, including in emergency situations. Usually the aerodynamic brake 60 is sufficient to decelerate the rotor to a freewheeling movement in a normal process of decelerating the wind power installation, and then using the mechanical operating brake 40 to bring the rotor 3 to a halt. Bringing the mechanical operating brake 40 into operation when the rotor 3 is still rotating, particularly in an emergency situation, when the rotor 3 is still rotating for example in the load range, means that the mechanical operating brake 40 increases the load moment on the rotor 3, that is to say deceleration thereof, to a quite considerable extent. In a serious situation the mechanical operating brake 40 represents a reliable means of bringing the rotor 3 to a halt, even when there is no network load.

It has been found that in addition—but possibly not in every case, in particular not for example when there is no network—load an electromagnetic brake 70 can be used to provide for automatic positioning of the rotor 3 relative to the stationary part of the pod 2 in such a way that arresting bolts 51 and arresting grooves 52 are identical in their angular positions. It has been found that controlled braking of the rotor 3 to the stopped condition, by means of controlling excitation, is comparatively easily possible. As a result, it is then possible to use as the brake, an aerodynamic brake 60 and the mechanical operating brake 40 (also referred to as the holding brake) and, possibly when there is a network supply, also an electromagnetic brake 70.

The particularly preferred method of braking the rotor 3 in an automated procedure provides in a first basic part of the method S-I, automated braking by means of the aerodynamic brake 60, particularly preferably utilizing excitation of the generator rotor 7.1, that is to say an electromagnetic brake 70. If the situation is not an emergency situation, a mechanical brake 40 can additionally decelerate the residual rotary movement of the rotor, beneath a certain threshold speed of the rotor, that is to say when it is only still freewheeling or is rotating only very slowly. Then, in a second basic part of the method S-II, automatic positioning of the rotor 3 relative to the stationary part of the pod 2 is effected, in particular in such a way that an arresting groove 52 comes to a stop practically opposite an arresting bolt 51; at any event however, at approximately the same angular position. It has been found that a latching moment of the generator 7 can advantageously be used in the positioning operation to stop the rotor within a latching unit. It has been found that the operation of braking the rotor 7 to the stopped condition can be effected by means of control/regulation of the excitation of the generator rotor and/or by means of control/regulation of the mechanical operating brake 40, more specifically in such a way that, with a residual movement, the result is exact positioning in the stopped condition, which makes it possible to provide an arresting action in the third basic part of the method S-III.

In the third basic part of the method S-III automatic or manual—here automatic—bolting engagement of the rotor is effected by introducing an automatic arresting bolt 51 into an arresting groove 52, as generally shown in FIG. 5. In addition the mechanical operating brake with a greater contact pressure of the brake pads 41 against the brake disc 42 as the holding brake in a condition of frictional engagement can form the first part of the mechanical fixing device 40; in other words, in addition to arresting the rotating part of the wind power installation (here the generator rotor 7.1 and/or in a modification the rotor hub housing 15), by arresting of the second part of the mechanical fixing device 50.

The combination of an arresting means in accordance with the mechanical fixing device 50 and also a holding brake or operating brake 40 of mechanical nature has proven particularly good in the context of a disc brake as shown here. For that purpose a brake disc 42 of the disc brake has not only a brake surface (for example the above-mentioned friction surfaces 16S) which can be gripped in frictional engagement by brake pads 41, but in addition a number of arresting grooves 52 (above-mentioned grooves 16N) into which a or a number of arresting bolts 51 can engage. The reference to a number is basically used to mean one or more, that is to say one, two, three and so forth.

Figure 7:
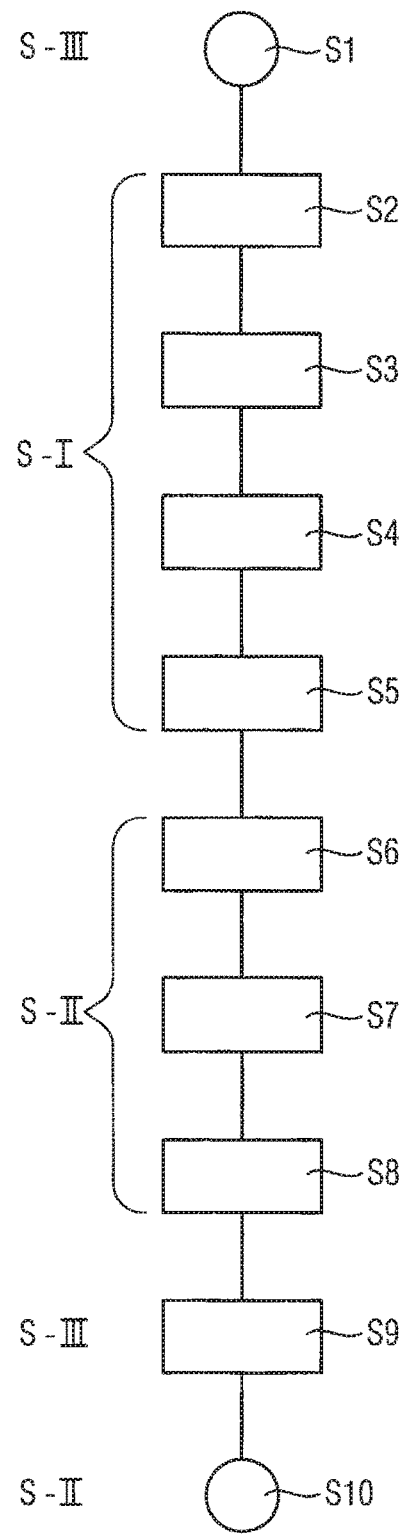
FIG. 7 shows a flow chart for a method of a preferred embodiment.

FIG. 7 shows a flow chart illustrating a preferred operating procedure for automatically and controllably braking and securing a rotor 3 in a wind power installation 1000, 1000A, 1000B as described above. An arresting action is basically possible and implemented in automated fashion; re-starting of the wind power installation is reliably prevented, with a reduced service time.

The method follows the basic structure with braking of the rotor 3 in a first part of the method S-I, positioning the rotor 3 at a stopped position in a second part of the method S-II and arresting the rotor 3 in the stopped position P1, P2 in a third part of the method S-III. In specific terms it is provided here that in a first part S-I, automated braking is effected by means of an aerodynamic brake 60 (by means of the pitch angle of the rotor blades 3.1, 3.2, 3.3), preferably in combination with braking by excitation of the rotor by way of an electromagnetic brake 70. In specific terms it is provided here that in the second part S-II, automatic positioning of the rotor relative to the stationary part of the pod (for example positioning of the arresting grooves relative to the arresting bolts) is effected, in particular by means of the latching moment of the generator 7, and controlled braking of the rotor 3 to the stopped condition (control of excitation by way of an electromagnetic brake 70 and control of the holding brake in the form of the mechanical operating brake 40, 40'). In specific terms it is provided here that in the third part S-III an automatic or manual bolting operation on the rotor is effected by means of the mechanical fixing device 50 (for example by introducing the arresting bolts into the arresting grooves=positively locking engagement) or the arresting action is produced by the holding brake (frictional engagement); this is with the aim of reliably preventing the rotor from re-starting.

In a first step S1 the wind power installation is put into the service status. In a second step S2 a selection of the required end position, that is to say the holding position, is effected by way of a key, keyboard or display and other man-machine interface (MMI) for bolting/arresting the installation. That holding position can be specified for example, having regard to the relative orientation of the generator rotor 7.1 relative to the generator stator 7.2, as the stopped position. Thus a position between 0 and 360° can be selected for a given rotor blade, for example for the rotor blade 3.1, as its end position, for example rotor blade 3.1 at the 12 o'clock position, and is then to be associated with a stopped position latched by way of the relative orientation of the generator rotor 7.1 relative to the generator stator 7.2.

In a third step S3 an aerodynamic brake 60 can be actuated by operating the pitch motors 61 to rotate the rotor blades 3.1, 3.2, 3.3 of the rotor 3 out of the wind. The rotor 3 freewheels; deceleration of the rotor occurs by means of the aerodynamic brake 60, as a consequence of turbulence and eddy separation phenomena.

In a fourth step S4 the rotary speed and deceleration of the installation can be ascertained.

In a fifth step S5 an additional excitation is applied to the pole shoes of the rotor 3 to increase the deceleration; in particular by means of the electromagnetic brake 70. The excitation is automatically selected in dependence on the prevailing rotary speed n and the prevailing deceleration a. In that way it is possible to implement controlled but at any event controlled braking of the rotor 3. Regulation of excitation can be found to be faster and more accurate than regulation of the mechanical operating brake 40.

The steps S2 to S5 substantially correspond to the automated braking operation in the first part of the method S-I. The steps S6 to S8 and S10 substantially correspond to the automated positioning operation in the second part S-II. Steps S1 and S9 substantially correspond to the automated arresting operation in the third part S-III.

In a sixth step S6 software or the like computer program product can be made available, which automatically calculates the rotary speed n and the position S at which the mechanical brake 40 is applied. That can be implemented by simultaneous braking by means of the electromagnetic brake 70, for example by excitation of the generator, in particular the generator rotor 7.1. In that way the rotor 3 is brought to a stop in a controlled fashion in such a way that the stopped position which is approached in accordance with the preset end position is associated in coincident relationship with an arresting position which is predetermined in fixed relationship with the installation, in particular in the case of a fixing device which is automatically applied with positively locking engagement thereof. To facilitate matters, arresting position distribution is matched to an arresting groove and/or pole distribution in such a way that an arresting position of the arresting position distribution is coincident with a latching position, governed by a latching moment, of the generator rotor. The last positioning operation can therefore be implemented by a latching moment of the generator 7. In the FIG. 5 example an arresting bolt 51 in the stopped position comes to a halt opposite an arresting groove 52, as a consequence of the controlling procedure.

In particular for that purpose a seventh step S7 for calculating the necessary deceleration values of the braking system 200 by way of the incremental encoder generally a sensor Sn, Sa of the sensor system 230 involves ascertaining values in a preliminary stage in a test braking operation, and providing for correction or optimization in the following braking operations. In that way it is possible to provide for calibration or continuous adaptations in ongoing operation of the deceleration values of the mechanical brake 40 and/or the electromagnetic brake 70, for example in a calibration module 220 of the controlling device 30; this is also in regard to the acute condition of a brake of the braking system 200 and possibly also in dependence on an outside temperature or a wind speed (measured by the sensor Sv) of the wind power installation 1000.

In an eighth step S8 the rotor 3 then automatically comes to rest, more specifically at that stoppage position which is associated with the end position defined in step S2, wherein a holding brake can be activated in the stopped position not only by frictional engagement (for example by frictionally closing the brake pads 41 against the brake disc 42) but also an arresting action (for example by applying at least one arresting bolt 51 to an arresting groove 52 in positively locking relationship).

In a ninth step S9 a bolting-in engagement operation or other arresting of the rotating part relative to the non-rotating part here the rotor hub housing 15 relative to the machine house casing 12—can be effected manually or automatically, by means of the mechanical fixing device 40, in the form of the arresting device, as shown by way of example in FIG. 5C. The arresting operation is found not to cause problems as an arresting bolt 51 has come to a halt in the stopped position opposite an arresting groove 52, as a consequence of the controlling procedure.

If however for operational reasons, the controlling procedure in step S10 should have to be interrupted and an assumed stopped position in step S9 should not have been arrestable, the parts S-II and S-III of the method for positioning and arresting the rotor 3 can be repeated, or one or more blades 3.1, 3.2, 3.3 can be pitched into the wind at times in order to increase the rotary speed n again and finally to arrive at an arrestable stopped position. An advantage with the method is the degree of reliability in the context of the controlling loop so that this can be automatically repeated without endangering the service personnel P. In particular, by making use of excitation, deceleration of the mechanical brake 40 and/or the aerodynamic brake 60 can additionally be achieved, so that the deceleration of the rotor 3 can be controlled markedly more accurately. For, the electromechanical brake 40 as the operating brake basically has only two conditions—closed or open—while excitation can be adapted continuously or stepwise, for example in a ramp or the like, and for example can be set at 30% or another suitable value of maximum excitation. Thus a controlling circuit with the controlling device 30 and the sensor system 230 and braking system 200 (mechanical brake 40 and/or electromagnetic brake 70 and/or aerodynamic brake 60) permits pin-point positioning of the rotor 3 in the stopped condition at an arrestable stopped position and then automatic arresting thereof in the stopped position, without any problem.

LIST OF REFERENCES

1 pylon
2 pod
3 rotor
3.1, 3.2, 3.3 rotor blades
4 spinner
5 rotor head
7 generator
7.1 generator rotor
7.2 generator stator
7P poles
7S stator winding
8 blade bearing
9 rotor hub
12 machine house casing
14 fixing means
15 rotor hub housing
16 fixing arm
16N, 16S grooves, friction surface
17S, 17P stator carrier arm, carrier structure
18 stator star
19 axle journal
20 machine house
21 platform
22 azimuth motors
23 azimuth bearing
24 machine carrier
30 sensor
30 controlling device
31, 31', 31" terminal
40, 40' operating brake, in particular disc brake
41 brake pad
42 brake disc
45 aerodynamic brake
50 fixing device, operating brake with arresting
51 arresting bolt
51.1 outside surface
52 arresting groove
52.1, 52.2 opening flanks
53 motor means
60 aerodynamic brake
61 pitch motor
70 electric brake
100 system comprising rotor 3, generator 7 and pod 2
200 braking system
210 braking module
220 calibration module
230 sensor system
240, 250, 260, 270 interfaces
1000, 1000A, 1000B wind power installation
A axis
a deceleration
n rotor rotary speed
P service personnel
P1, P2 stopped position
R radial direction
r radius
S position Sv, Sn, Sa sensors for measuring wind speed v, deceleration a, rotor speed n
S-I, S-II, S-III parts of the method
U periphery
S1-S10 method steps 1 to 10

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wind power installation, the method comprising:
   applying a braking operation on a rotor of a generator of the wind power installation;
   continuing the braking operation until the rotor gets to a predetermined end position; and
   stopping and fixing the rotor at the predetermined end position by using a mechanical fixing device configured to fix the rotor at the predetermined end position,
   wherein stopping the rotor at the predetermined end position comprises using a latching moment of the generator for stopping the rotor at the predetermined end position,
   wherein the predetermined end position of the rotor is predetermined by predetermining an angular position of the rotor and associating the angular position with a latching position of the generator,
   wherein the predetermined end position is determined by a discrete latching scale over an angle division on the generator that is predetermined by an arresting groove distribution or pole distribution over a generator ring of the generator,
   wherein an arresting position distribution is matched to the pole distribution or the arresting groove distribution in such a way that an arresting position of the arresting position distribution coincides with the latching position distribution governed by the latching moment of the generator rotor, and
   wherein the mechanical fixing device is applied automatically, wherein stopping the rotor at the predetermined end position by the mechanical fixing device comprises engaging an arresting bolt in an arresting hole or groove.

2. The method according to claim 1 wherein fixing the rotor comprises fixing the rotor to a stator of the generator.

3. The method according to claim 1 wherein fixing the rotor comprises fixing a rotor hub housing to a machine house casing.

4. The method according to claim 2 wherein fixing the rotor comprises fixing at least one of a rotor hub and a bearing of the rotor to the stator.

5. The method according to claim 2 wherein fixing the rotor comprises arresting the rotor in a positively locking relationship with the stator.

6. The method according to claim 1 wherein stopping the rotor comprises using a mechanical brake.

7. The method according to claim 1 wherein applying the braking operation includes at least one of the following:
   activating a mechanical braking action in response to communication from a control device;
   activating an aerodynamic braking action in response to communication from a control device, and
   excitation of the generator.

8. The method according to claim 1 further comprising measuring at least one of: a rotary speed and a deceleration of the rotor using an incremental encoder, and using at least one of the rotor speed and the deceleration of the rotor for controlling the braking operation.

9. The method according to claim 1 wherein applying the braking operation comprises exciting pole shoes of the generator rotor with an excitation means that is predetermined in dependence on an excitation brake control value, wherein the excitation brake control value includes one or more values selected from the group of values including: rotary speed, deceleration, external temperature and wind speed.

10. The method according to claim 1 wherein applying the braking operation comprises applying an aerodynamic braking action that includes pitching a rotor blade of the rotor out of the wind and an air brake control value includes one or more values selected from the group of values including: rotary speed, deceleration, external temperature and wind speed.

11. The method according to claim 1 wherein applying the braking operation comprises applying a mechanical brake action that is predetermined by an application brake control in dependence on a brake application control value, wherein the brake application control value includes one or more values selected from the group of values including: rotary speed, deceleration, external temperature and wind speed.

12. The method according to claim 11 wherein the application brake control is calibrated.

13. The method according to claim 11 wherein the application brake control provides learning optimization for optimizing the brake application, including on the basis of a plurality of operational braking operations.

14. The method according to claim 1 wherein the rotor is fixed at the predetermined end position by frictional engagement and positively locking engagement.

15. The method according to claim 1 wherein the mechanical fixing device automatically fixes the rotor at the predetermined end position and forms a positively locking relationship with a stator of the generator.

16. A control device for a wind power installation adapted to carry out the method according to claim 1.

17. A non-transitory computer-readable storage medium having stored thereon executable instructions that, when executed by a control device, cause the control device to perform the steps of the method according to claim 1.

18. A non-transitory digital storage medium for linking to a computer system or a control device, with electronically readable computer-implementable instructions that are configured to co-operate with a computer system or the control device in such a way to implement the method according to claim 1.

* * * * *